United States Patent [19]
Rabow

[11] 3,859,658
[45] Jan. 7, 1975

[54] CONICAL SCAN TRACKING SYSTEM

[75] Inventor: Gerald Rabow, Nutley, N.J.

[73] Assignee: International Telephone and Telegraph Corporation, Nutley, N.J.

[22] Filed: Oct. 16, 1972

[21] Appl. No.: 298,059

[52] U.S. Cl. .................................. 343/7.4, 343/118
[51] Int. Cl. ........................... G01s 3/56, G01s 9/02
[58] Field of Search ...................... 343/7 A, 7.4, 118

[56] References Cited
UNITED STATES PATENTS

| | | | |
|---|---|---|---|
| 2,726,387 | 12/1955 | Allison | 343/118 X |
| 2,946,998 | 7/1960 | Jolliffe et al. | 343/118 |
| 3,419,867 | 12/1968 | Pifer | 343/118 X |
| 3,422,428 | 1/1969 | Jensen | 343/7.4 X |

Primary Examiner—Malcolm F. Hubler
Attorney, Agent, or Firm—C. Cornell Remsen, Jr.

[57] ABSTRACT

There is disclosed herein a conical scan tracking system to track an energy source wherein the speed of nutation is controlled in a pseudorandom manner rather than in a constant manner as in the prior art to eliminate false antenna pointing errors caused by incidental or deliberate amplitude modulation at the constant nutation or scan frequency of the energy received from the source being tracked.

5 Claims, 2 Drawing Figures

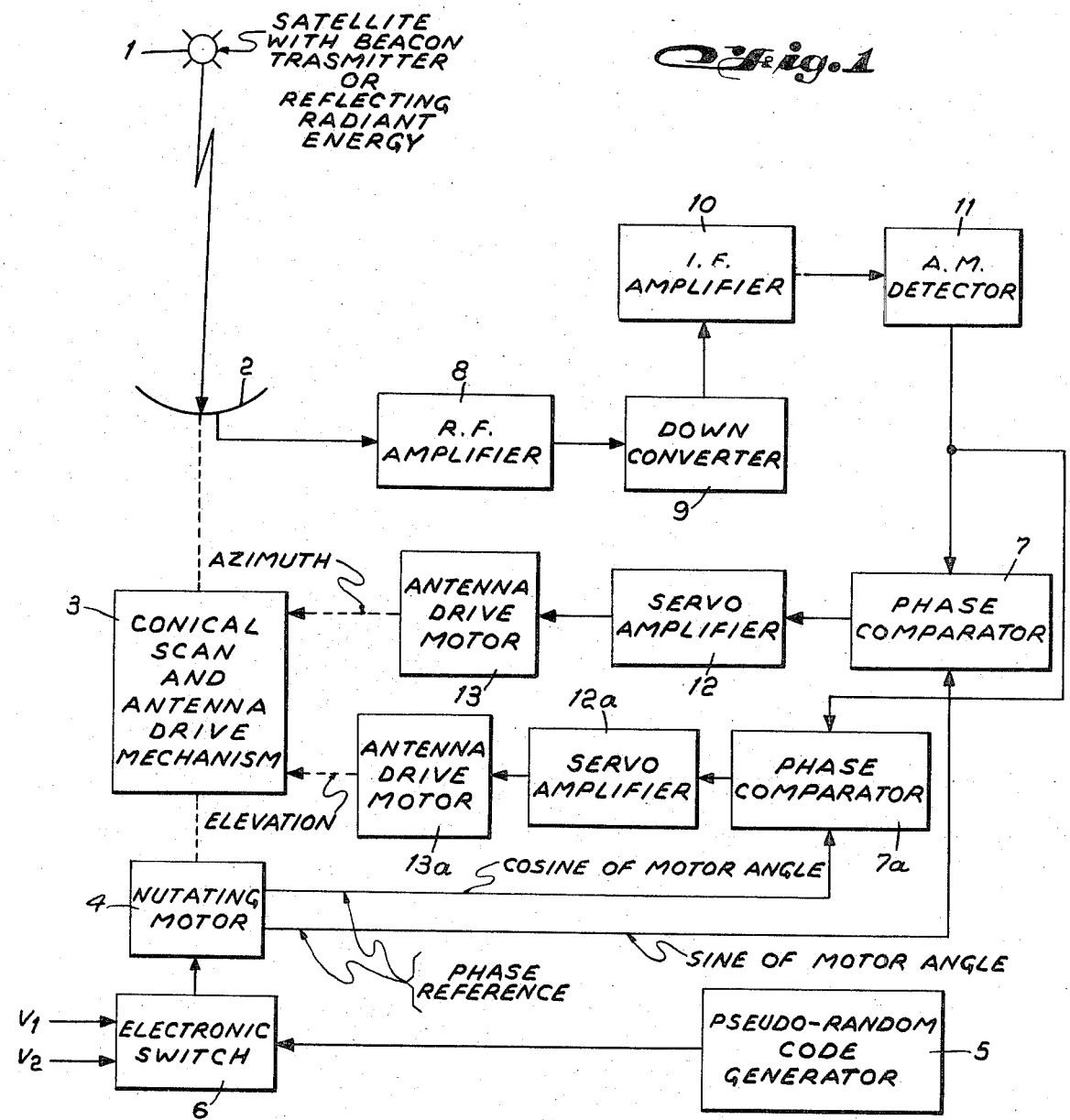
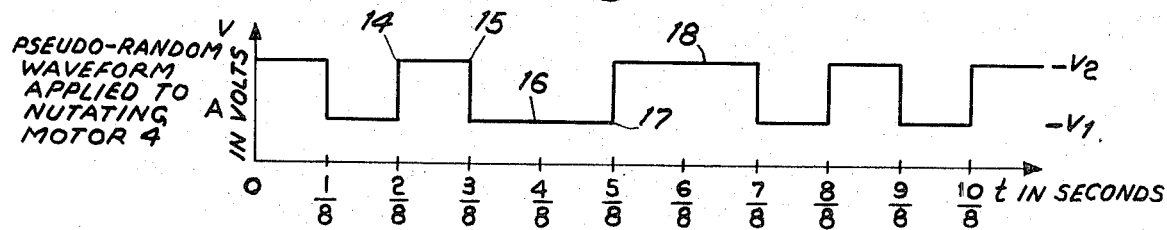

CONICAL SCAN TRACKING SYSTEM

BACKGROUND OF THE INVENTION

This invention relates to tracking systems and more particularly to a conical scan tracking system.

It is known from the prior art that a conical scan tracking system is a relatively simple means of sensing the magnitude and direction of the angle or pointing error between the central axis of an antenna radiation pattern and a source of energy, such as radio frequency (RF) signals, which is being tracked. This is accomplished by nutating the antenna feed or an auxiliary reflector about the central or pointing axis of the antenna radiation pattern or beam. When the central pointing axis of the nutated radiation pattern is pointing directly at the source of energy a continuous wave radio frequency signal is received. However, when the central axis of the radiation pattern of the antenna is not pointing at the source of energy there is obtained amplitude modulation of the received energy at the frequency of nutation. By determining the phase of the received amplitude modulated energy relative to the nutation phase, an error signal can be determined and can be applied to a nulling servo, if desired, to null the error signal and thereby cause the central axis or pointing axis of the antenna radiation pattern to be pointed directly toward the source of energy.

The disadvantage of such conical scan systems is that these systems are very susceptible to incidental or deliberate amplitude modulation occurring at the scan or nutation frequency which causes an error in the derived error signal which when applied to a nulling servo will cause an error in the pointing of the antenna toward the energy source.

SUMMARY OF THE INVENTION

An object of the present invention is to provide a conical scan tracking system that overcomes the above-mentioned disadvantage of prior art conical scan tracking systems.

Another object of the present invention is to provide a conical scan tracking system wherein the scanning or nutation speed is varied in a pseudo-random manner.

A feature of the present invention is the provision of a system to track a source of energy comprising: an antenna having a given radiation pattern in communication with the source to receive energy from the source; first means coupled to the antenna to nutate the radiation pattern about a given axis at a pseudo-random rate; second means coupled to the antenna to detect amplitude modulation of the energy, the amplitude modulation being at the pseudo-random rate when there is a pointing error between the given axis and the source; and thrid means coupled to the first means and the second means to compare the phase of the amplitude modulation of the energy with the phase of the nutation and to produce a signal proportional to the direction and magnitude of the pointing error.

BRIEF DESCRIPTION OF THE DRAWING

Above-mentioned and other features and objects of this invention will become more apparent by reference to the following description taken in conjunction with the accompanying drawing, in which:

FIG. 1 is a block diagram of a conical scan tracking system in accordance with the principles of the present invention; and FIG. 2 illustrates in Curve A an example of a pseudo-random waveform used to control the nutating motor of FIG. 1 and in Curve B a vector diagram of the phase of nutation caused by the magnitude of the voltage V1 and V2 of Curve A with respect to a constant speed nutation motor.

DESCRIPTION OF THE PREFERRED EMBODIMENT

The following description of the pseudo-random conical scan tracking system of the present invention is directed toward a tracking system for tracking a satellite which carries therein a beacon transmitter to emit a radio frequency beacon signal or a satellite which reflects radiant energy in a radar type system. It is to be understood, however, that the principles of the present invention may be applied to tracking any source of energy, such as light energy or infrared energy, remembering, of course, that the receiving, detecting and phase comparing apparatus and the antenna must be compatible with the type of energy involved.

Referring to FIG. 1, there is disclosed therein a block diagram of a pseudo-random conical scan tracking system to track the energy emitted directly from or reflected from a satellite 1. The energy from satellite 1, whether it be directly emitted or reflected, is received on a suitable radio frequency antenna 2 which has mechanically coupled thereto conical scan and antenna drive mechanism 3. The nutating motor 4 is mechanically coupled to that portion of mechanism 3 that nutates or mechanically scans the antenna feed or an auxiliary reflector so as to nutate the radiation pattern of the antenna about a given axis, such as the center of the antenna radiation pattern. This given axis is the pointing axis of the antenna and to properly track satellite 1 the antenna pointing axis must be directed directly at satellite 1. Any angle that is developed between the pointing axis and satellite 1 results in an amplitude modulation of the radio frequency energy from satellite 1 received by antenna 2 with the amplitude modulation being at the frequency or rate of the pseudo-random waveform controlled nutating motor 4.

In accordance with the principles of the present invention there is provided a pseudo-random code generator 5 that generates a pseudo-random code having a code pattern as illustrated, for purposes of explanation, in Curve A, FIG. 2. The code signal of generator 5 is coupled to electronic switch 6 to control the coupling of two voltage sources to motor 4 in accordance with the code pattern of the code signal at the output of generator 5. As illustrated in FIG. 1, one voltage source is identified as V1 and is, as illustrated in Curve A, FIG. 2, the lower magnitude voltage of the waveform at the output of switch 6. The second voltage source is identified in FIG. 1 as V2 and is the higher magnitude voltage as illustrated in Curve A, FIG. 2 of the waveform at the output of switch 6.

The sine or cosine of the angle of the shaft at motor 4 obtained from a scan reference generator attached to said shaft is coupled as the phase reference to one input of phase comparators 7 and 7a which is employed to produce a signal proportional to the direction and magnitude of the pointing error or angle between the pointing axis of the antenna and satellite 1.

As long as antenna 2 has its pointing axis directed directly to satellite 1, (pointing angle equal to zero) the energy from satellite 1 will be received by antenna 2 as a constant amplitude wave. When there is an angle between the pointing axis and the energy radiated from satellite 1, an amplitude modulation of this energy will be produced having a pseudo-random frequency or rate in synchronism with motor 4, but phase shifted with respect thereto. The amount and direction of phase shift is dependent upon the direction and magnitude of the angle between the pointing axis and the energy from satellite 1. The amplitude modulated energy from satellite 1 is received on antenna 2 and coupled to radio frequency amplifier 8 and, hence, to a down converter 9 to convert the received amplitude modulated RF signal to an intermediate frequency (IF) signal. The output of converter 9 is coupled to IF amplifier 10 and, hence, to an amplitude detector 11. The output of amplitude detector 11 will be a sinewave of pseudo-random frequency in synchronism with motor 4 having an amplitude and a phase dependent upon the magnitude and direction of the pointing error. This phase difference is detected in phase comparators 7 and 7a which produce signals proportional to the magnitude of the pointing error in two directions such as azimuth and elevation. The output signals of phase comparators 7 and 7a can, if desired, be applied respectively to servo amplifiers 12 and 12a and, hence, to antenna drive motors 13 and 13a which drives that portion of mechanism 3 which controls the elevation and azimuth of the entire antenna 2 including the antenna feed, the main reflector and the auxiliary reflector, if it is employed in the nutation process.

For purposes of explanation, let it be assumed that a two way round trip delay to a stationary satellite is about one-half second. If the expected value of any component of nutation phase one-half second after observation can be made equal to zero, the coherent jamming of the scan or nutation frequency becomes impossible, and the usual antijamming improvement equal to the ratio of the psuedo-random bandwidth to servo bandwidth results. A convenient waveshape to be applied to nutation motor 4 is shown in Curve A, FIG. 2. As illustrated in Curve A, FIG. 2 over any ¼ second interval, the voltage applied to motor 4 is first high and then low, or first low and then high, the selection being made pseudo-randomly as controlled by the code signal at the output of generator 5. At the end of the ¼ second interval the speed of motor 4 will be the same as the beginning of the interval, but the motor either speeds up or slows down in the middle of the interval. For instance, the speed of the motor at point 14 has a given value. With the voltage having a magnitude of V2 the motor will speed up until it reaches point 15. At point 15 the voltage applied to motor 4 changes to V1 and the speed of the motor will decrease such that at point 16 the speed of the motor is the same as the point 14. In a similar manner, the speed at point 16 has a given value and decreases until it reaches a point 17 due to the valve of voltage V1. At point 17 the voltage applied to motor 4 changes to a value V2 and causes the motor 4 to increase its speed until at point 18 it reaches the same speed as it had at point 16.

The magnitude of the voltages V1 and V2 are chosen such that the nutation of the antenna radiation pattern will have been advanced or retarded by 90° at the end of the ¼ second interval with respect to a nutation motor running at a constant speed. This advance or retarding of the nutation phase by 90° is illustrated by the vectors in Curve B, FIG. 2. Correspondingly, at midinterval the phase of nutation will have been advanced or retarded by 45°, hence, the acceleraton is $(2 \times 45°)/(⅛ \text{ second})^2$, or 16 revolutions/second$^2$, and the peak speed increase or decrease from average is ±16 revolutions/seconds$^2 \times ⅛$ second = ±2 revolutions per second.

An increase in the psuedo-random rate of control of nutation motor 4 increases the protection ratio against false amplitude modulation of the received energy as well as required motor acceleraton.

It should be noted that where the servo time constant is made extremely long, as when optimizing the tracking system for tracking a small excursion at a one cycle per day rate, then the avoidance of coherent interference by the above pseudo-noise scan tracking system permits the use of very small squint angles, and hence, very small nutation loss.

While I have described above the principles of my invention in connection with specific apparatus it is to be clearly understood that this description is made only by way of example and not as a limitation to the scope of my invention as set forth in the objects thereof and in the accompanying claims.

I claim:

1. A system to track a source of energy comprising:
   an antenna having a given radiation pattern in communication with said source to receive energy from said source;
   a pseudo-random code generator to produce a pseudo-random code signal;
   a nutating motor;
   a first source of voltage having a first given magnitude;
   a second source of voltage having a second given magnitude greater than said first given magnitude;
   switch means coupled to said nutating motor, said code generator and said first and second sources of voltage, said switch means coupling said voltages of said first and second sources to said motor in response to said pseudo-random code signal produced by said generator to control the speed of said nutating motor in a pseudo-random manner and thereby nutate said radiation pattern about a given axis at a pseudo-random rate;
   first means coupled to said antenna to detect amplitude modulation of said energy, said amplitude modulation being at said pseudo-random rate when there is a pointing error between said given axis and said source; and
   second means coupled to said nutating motor and said first means to compare the phase of said amplitude modulation of said energy with the phase of said nutation and to produce a signal proportional to the direction and magnitude of said pointing error.

2. A system according to claim 1, wherein said source includes
   a satellite having beacon transmitter.

3. A system according to claim 1, wherein said source includes
   a satellite reflecting radiant energy.

4. A system according to claim 1, wherein said first and second magnitudes each have a value that will advance or retard said nutation 90° at the end of a given time interval with respect to a nutation motor running at a constant speed.

5. A system according to claim 1, further including third means coupled to said second means and said antenna responsive to said signal to drive said antenna to null said pointing error.

* * * * *